March 26, 1929.  E. GAUTHIER  1,706,729
MACHINE FOR WORKING METAL STRANDS
Filed Aug. 5, 1925  2 Sheets-Sheet 2
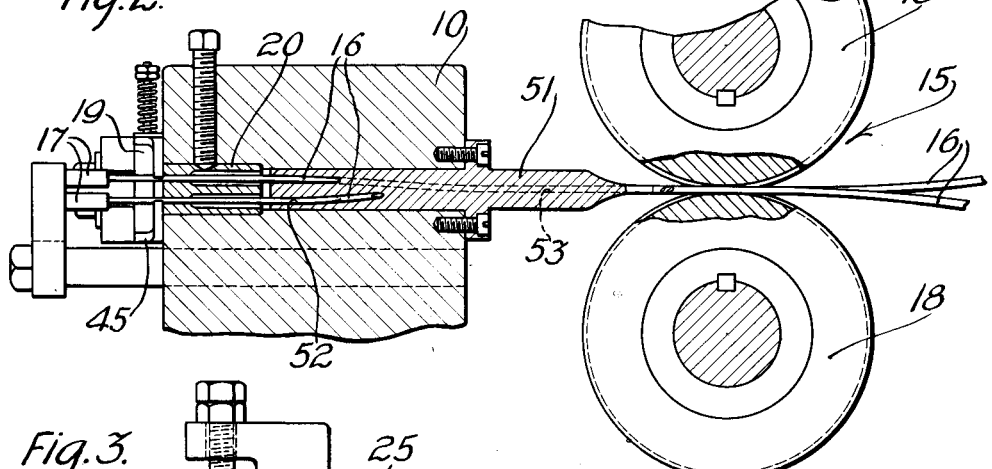
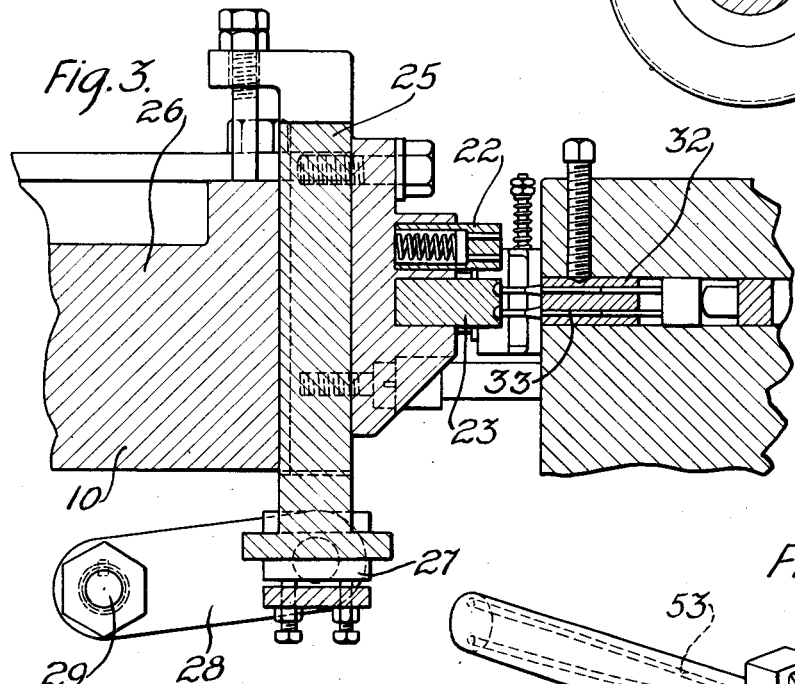
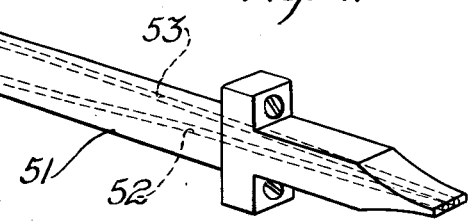
Inventor
Ernest Gauthier
by
Att'y.

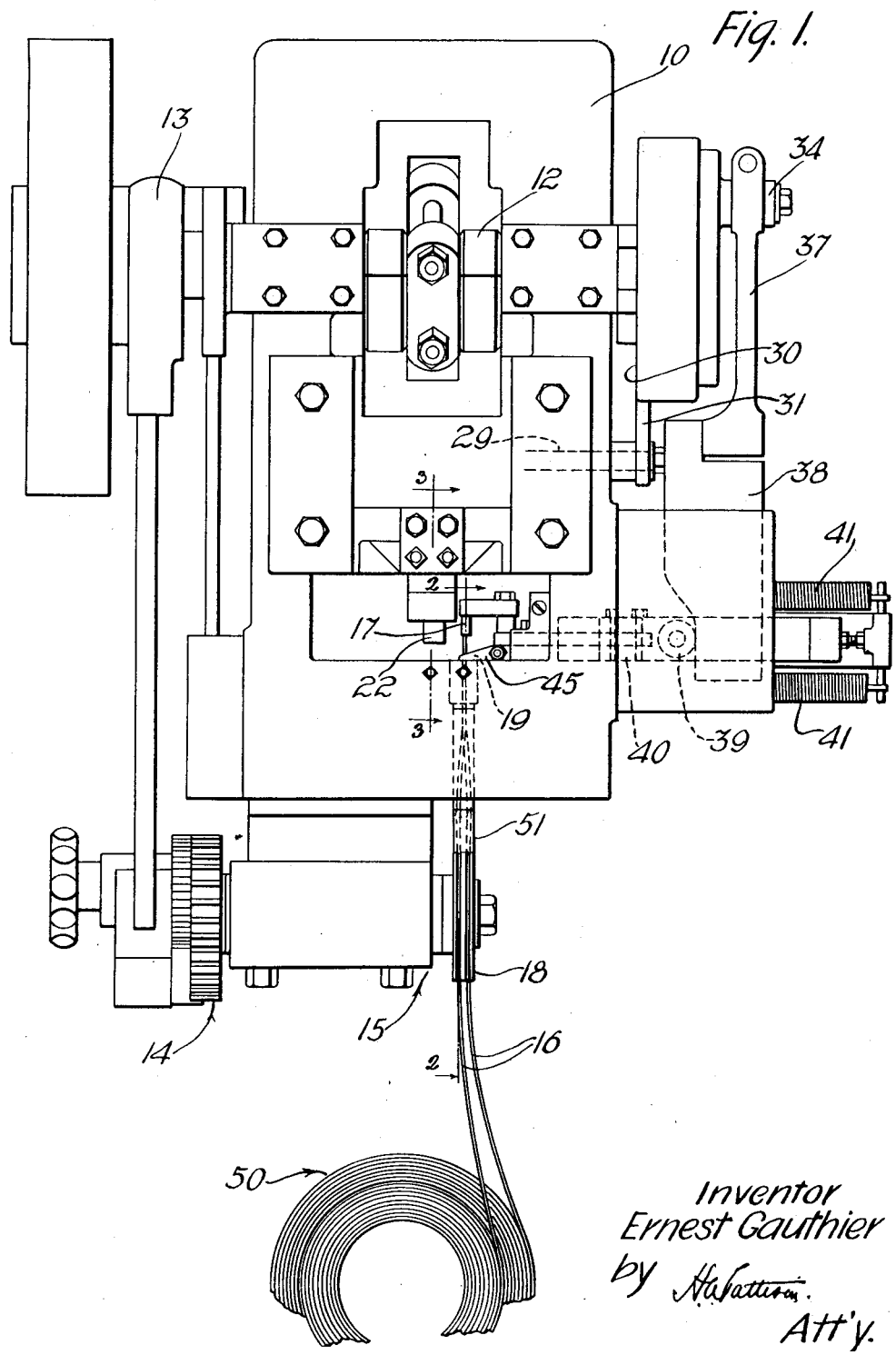

Patented Mar. 26, 1929.

1,706,729

UNITED STATES PATENT OFFICE.

ERNEST GAUTHIER, OF CHICAGO, ILLINOIS, ASSIGNOR TO WESTERN ELECTRIC COMPANY, INCORPORATED, OF NEW YORK, N. Y., A CORPORATION OF NEW YORK.

MACHINE FOR WORKING METAL STRANDS.

Application filed August 5, 1925. Serial No. 48,225.

This invention relates to a machine for working metal strands, and more particularly to a machine for producing headed blanks therefrom which may subsequently be formed into screws, bolts and the like.

The invention is particularly well adapted for use in conjunction with machines for simultaneously producing a plurality of headed blanks from a plurality of continuous metal strands. In the operation of machines of this type a plurality of metal strands are simultaneously presented to a cutting mechanism which severs therefrom blanks of a predetermined length, which blanks are subsequently headed by multiple upsetting and finishing dies.

In the construction of machines of the above character, it is sometimes convenient to provide a multiple cutting die which operates in a horizontal plane, in which cases It is usually necessary, in order to produce blanks of uniform length, to arrange the strands in a vertical row as they are moved past the cutting mechanism. However, it may be convenient in some instances to arrange the strands in a horizontal layer or some other formation as they are withdrawn from their supply sources and fed into the machine.

The principal object of this invention is the provision in a machine for simultaneously working a plurality of continuous metal strands, of means for changing the positions of the strands with respect to each other as they are advanced to the machine.

One form of the invention is embodied in a machine for simultaneously producing headed blanks from a pair of continuous metal strands which are advanced through the machine by a pair of cooperating feed rollers. The feed rollers are preferably disposed with their peripheries in a vertical plane and are provided with a pair of annular grooves which serve to maintain the strands in a fixed relation with respect to each other as they are withdrawn from their supply sources. After leaving the feed rollers the strands, being arranged side by side in a horizontal plane, are advanced through a quill or guide member which positions them in a vertical plane and at a predetermined distance from each other as they are presented to the cutting mechanism.

Other objects and features of the invention will become apparent in the following detailed description, reference being had to the accompanying drawings wherein Fig. 1 is a plan view of a multiple heading machine embodying the invention;

Figs. 2 and 3 are fragmentary detail sections taken on the lines 2—2 and 3—3, respectively, of Fig. 1, and Fig. 4 is a perspective view of the quill which changes the positions of the strands with respect to each other.

Referring now to the drawings in detail, which illustrate the invention as embodied in a machine for simultaneously heading a pair of blanks from which screws, bolts and the like may subsequently be manufactured, the numeral 10 indicates a main supporting frame within which is journaled a crank shaft 12 which may be driven by any suitable means (not shown). An eccentric 13 is driven by the crank shaft 12 and, through suitable gearing indicated generally at 14, actuates a feeding mechanism 15 which comprises a pair of cooperating grooved rollers 18, 18. The feeding mechanism 15 is adapted to intermittently advance against stops 17, 17, a pair of continuous strands 16, 16 drawn from a supply source indicated at 50.

The strands 16 are positioned side by side in a horizontal plane as they leave the feeding rollers 18 and while in this position are advanced through a quill or guide member 51 (Fig. 4) which positions them in a vertical plane and at a predetermined distance from each other as they are advanced to the stops 17. The quill 51 is suitably secured to the frame 10 between the feeding rollers 18 and the stops 17 (Fig. 2), and is provided with apertures 52 and 53 for the passage of the strands. The forward ends of these apertures lie side by side in the same horizontal plane and their rearward ends lie in the same vertical plane and at a predetermined distance apart and both apertures are so curved that the positions of the strands with respect to each other are changed from a horizontal plane to a vertical plane as hereinbefore described.

Since the general construction of the heading machine illustrated in the accompanying drawings is well known in the art and since the present invention is not particularly concerned therewith, it is believed that a brief description thereof will be sufficient.

Each time the strands 16 are advanced against the stops 17 a cut off blade 19 cooperates with a die block 20 to sever the strands into predetermined lengths (Fig. 2). The severed sections of the strands constitute blanks which are headed, in pairs, by a double upsetting die 22 and a double finishing die 23 (Fig. 3). A plurality of gripping fingers 45, 45 cooperate with the cut off blade 19 to transfer the severed blanks from the position wherein they rest against the stop 17 to a position wherein they may be engaged by the dies 22 and 23. The cut off blade with its cooperating gripping fingers is of the type described and claimed in the patent to Burns L. Whited, No. 1,677,159, issued July 17, 1928, and since it forms no part of this invention it is thought that a further detailed description thereof is unnecessary.

The dies 22 and 23 are mounted on a slide 25 journaled in a second slide 26 which is reciprocated by the crank shaft 12. The slide 25 also makes sliding engagement with a block 27 pivotally mounted on the free end of a lever 28 secured to a shaft 29 journaled in the frame 10. A cam 30 which is keyed to the crank shaft 12 oscillates the shaft 29 through the medium of a lever 31. The machine is so designed that the crank shaft 12 will cause the dies 22 and 23 to be reciprocated twice during each cycle of operation so that the upsetting die 22 will first upset an end of each blank and the finishing die 23 will complete the head on each blank, the slide 25 being reciprocated by the lever 31 to alternately bring the upsetting die 22 and the finishing die 23 into alignment with a die block 32 having bores 33 adapted to receive the shank portions of the blanks.

Pivotally secured to a crank pin 34 constrained to rotate with the crank shaft 12 is a lever 37 which is pivotally connected to a cam plate 38 suitably mounted in the frame 10. An anti-friction roller 39 mounted on a slide 40 is urged into engagement with the cam plate 38 by tension springs 41. The slide 40 carries the cut off blade 19, the construction is such that the cut off blade 19 will be reciprocated once during each cycle of operation to sever the strands 16 and to transfer the blanks so formed to the heading position, the gripping fingers 45 being adapted to cooperate with the cut off blade to hold the blanks while they are being moved to the heading position.

What is claimed is:

1. In a machine for simultaneously producing a plurality of headed blanks from a plurality of continuous metal strands, a severing mechanism for simultaneously cutting the strands into predetermined lengths, a feeding mechanism for simultaneously advancing the strands to said severing mechanism, and a tubular guiding means for changing the positions of the strands relative to each other as they are advanced to said severing mechanism.

2. In a machine for simultaneously producing a plurality of headed blanks from a plurality of continuous metal strands, a severing mechanism for simultaneously cutting the strands into predetermined lengths, a feeding mechanism for simultaneously advancing the strands to said severing mechanism, and means for changing the positions of the strands relative to each other as they are advanced to said severing mechanism, said last mentioned means comprising a quill having a plurality of apertures for the passage of the strands, said apertures being so curved that the relative positions of the strands with respect to each other are changed as the strands are advanced therethrough.

3. In a machine for working metal strands, means for simultaneously advancing a plurality of continuous metal strands, means for simultaneously severing said strands into predetermined lengths, and guiding means interposed between the advancing and the severing means for changing the relative positions of the strands with respect to each other during the advancement thereof.

In witness whereof, I hereunto subscribe my name this 28th day of July A. D., 1925.

ERNEST GAUTHIER.